(12) United States Patent
Oluwafemi et al.

(10) Patent No.: US 9,632,961 B2
(45) Date of Patent: Apr. 25, 2017

(54) CROSSTALK AWARE DECODING FOR A DATA BUS

(71) Applicant: Intel Corporation, Santa Clara, CA (US)

(72) Inventors: Olufemi B. Oluwafemi, Hillsboro, OR (US); Stephen H. Hall, Forest Grove, OR (US); Jason A. Mix, Hillsboro, OR (US); Earl J. Wight, Aloha, OR (US); Chaitanya Sreerama, Hillsboro, OR (US); Michael W. Leddige, Beaverton, OR (US); Paul G. Huray, Georgetown, SC (US)

(73) Assignee: INTEL CORPORATION, Santa Clara, CA (US)

( * ) Notice: Subject to any disclaimer, the term of this patent is extended or adjusted under 35 U.S.C. 154(b) by 876 days.

(21) Appl. No.: 13/844,671

(22) Filed: Mar. 15, 2013

(65) Prior Publication Data

US 2014/0181348 A1 Jun. 26, 2014

Related U.S. Application Data

(63) Continuation-in-part of application No. 13/726,748, filed on Dec. 26, 2012, now Pat. No. 9,330,039.

(51) Int. Cl.
*G06F 13/40* (2006.01)

(52) U.S. Cl.
CPC ...... *G06F 13/4004* (2013.01); *G06F 13/4022* (2013.01)

(58) Field of Classification Search
CPC .......................... G06F 13/4022; G06F 13/4004
See application file for complete search history.

(56) References Cited

U.S. PATENT DOCUMENTS 6,094,464 A * 7/2000 Ebringer et al. .............. 375/342
6,128,112 A 10/2000 Harres
(Continued)

FOREIGN PATENT DOCUMENTS

CN  104050119 A   9/2014
EP  1164758 A2   12/2001
(Continued)

OTHER PUBLICATIONS

Chang, Kuei-Chung, "Reliable network-on-chip design for multi-core system-on-chip", The Journal of Supercomputing, Kluwer Academic Publishers, BO, vol . 55, No. 1,Dec. 23, 2009 (Dec. 23, 2009), pp. 86-102, XP019865181, ISSN: 1573-0484, DOI: 10.1007/S11227-009-0376-4 (17 pages).
(Continued)

*Primary Examiner* — Nimesh G Patel
(74) *Attorney, Agent, or Firm* — International IP Law Group, P.L.L.C.

(57) ABSTRACT

Techniques for decoding encoded data are described herein. An example of a device in accordance with the present techniques includes a receiving signaling module coupled to a plurality of signal lines. The signaling module includes a receiver to receive a plurality of encoded line voltages or currents on the plurality of signal lines of a bus, wherein each one of the plurality of encoded line voltages corresponds to a weighted sum of data. The signaling module includes a comparator to determine the voltage level of each line at a unit interval and convert the voltage level to a digital value. The signaling module includes a lookup table correlating the digital value with a digital bit stream.

17 Claims, 10 Drawing Sheets

(56) References Cited

U.S. PATENT DOCUMENTS

| | | | |
|---|---|---|---|
| 6,624,873 B1 | 9/2003 | Callahan, Jr. et al. | |
| 7,133,463 B1 | 11/2006 | Amirkhany et al. | |
| 7,583,209 B1* | 9/2009 | Duan | 341/80 |
| 2006/0179358 A1 | 8/2006 | Cordero et al. | |
| 2007/0058744 A1* | 3/2007 | Amirkhany | G06J 1/005 375/260 |
| 2007/0229324 A1* | 10/2007 | Visalli et al. | 341/51 |
| 2007/0271535 A1* | 11/2007 | Hwang et al. | 716/5 |
| 2010/0189186 A1* | 7/2010 | Zerbe | H04B 3/32 375/257 |
| 2012/0063291 A1* | 3/2012 | Hsueh | H04B 1/7103 370/201 |
| 2013/0208579 A1* | 8/2013 | Strobel et al. | 370/201 |
| 2013/0266046 A1* | 10/2013 | Sudhakaran et al. | 375/219 |
| 2014/0181357 A1 | 6/2014 | Hall et al. | |
| 2014/0181358 A1 | 6/2014 | Sreerama et al. | |

FOREIGN PATENT DOCUMENTS

| | | |
|---|---|---|
| EP | 2778940 A2 | 3/2014 |
| JP | 2001144620 | 5/2001 |
| KR | 102011004801 | 1/2011 |
| TW | 200705452 | 2/2007 |

OTHER PUBLICATIONS

Extended European Search Report issued by the European Patent Office on Nov. 13, 2014 for European Patent Application No. 14160003.1 (8 pages).

Yan, Zhou et al: "S-parameter based multimode signaling", Electrical Performance of Electronic Packaging and Systems (EPEPS), 2012 IEEE 21ST Conference on, IEEE, Oct. 21, 2012 (Oct. 21, 2012), pp. 11-14, XP032328688, DOI: 10.1109/EPEPS.2012.6457832, ISBN: 978-1-4673-2539-4 (4 pages).

International Search Report and Written Opinion received for PCT Patent Application No. PCT/US2013/047642, mailed on Oct. 7, 2013, 11 pages.

Supplementary European Search Report, EP Application No. 13867297, date of completion Aug. 16, 2016, 3 pages.

Honig et al., Multichannel Signal Processing for Data Communications in the Presence of Crosstalk, IEEE, Apr. 1, 1990, 8 pages, vol. 38, No. 4, IEEE Transactions on Communications, USA.

\* cited by examiner $$W = \begin{array}{|c|c|c|c|} \hline W_{1,1} & W_{1,2} & \cdots & W_{1,N} \\ \hline W_{2,1} & W_{2,2} & \cdots & W_{2,N} \\ \hline \vdots & \vdots & \ddots & \vdots \\ \hline W_{N,1} & W_{N,2} & \cdots & W_{N,N} \\ \hline \end{array}$$

$$\mathbf{I} = W^{-1} \equiv \begin{array}{|c|c|c|c|} \hline I_{1,1} & I_{1,2} & \cdots & I_{1,N} \\ \hline I_{2,1} & I_{2,2} & \cdots & I_{2,N} \\ \hline \vdots & \vdots & \ddots & \vdots \\ \hline I_{N,1} & I_{N,2} & \cdots & I_{N,N} \\ \hline \end{array}$$

| Output of Comparator | | | | Recovered Binary Bit Stream | | | |
|---|---|---|---|---|---|---|---|
| Line 1 | Line 2 | Line 3 | Line 4 | Line 1 | Line 2 | Line 3 | Line 4 |
| 0001 | 0111 | 0001 | 0001 | 0 | 0 | 0 | 0 |
| 0011 | 0011 | 0011 | 0000 | 0 | 0 | 0 | 1 |
| 0011 | 0011 | 0000 | 0011 | 0 | 0 | 1 | 0 |
| 0111 | 0001 | 0001 | 0001 | 0 | 0 | 1 | 1 |
| 0000 | 0011 | 0011 | 0011 | 0 | 1 | 0 | 0 |
| 0001 | 0001 | 0111 | 0001 | 0 | 1 | 0 | 1 |
| 0001 | 0001 | 0001 | 0111 | 0 | 1 | 1 | 0 |
| 0011 | 0000 | 0011 | 0011 | 0 | 1 | 1 | 1 |
| 0011 | 1111 | 0011 | 0011 | 1 | 0 | 0 | 0 |
| 0111 | 0111 | 0111 | 0001 | 1 | 0 | 0 | 1 |
| 0111 | 0111 | 0001 | 0111 | 1 | 0 | 1 | 0 |
| 1111 | 0011 | 0011 | 0011 | 1 | 0 | 1 | 1 |
| 0001 | 0111 | 0111 | 0111 | 1 | 1 | 0 | 0 |
| 0011 | 0011 | 1111 | 0011 | 1 | 1 | 0 | 1 |
| 0011 | 0011 | 0011 | 1111 | 1 | 1 | 1 | 0 |
| 0111 | 0001 | 0111 | 0111 | 1 | 1 | 1 | 1 |

CROSSTALK AWARE DECODING FOR A DATA BUS

TECHNICAL FIELD

This disclosure relates generally to techniques for reducing crosstalk between signal lines in a computing device. More specifically, the disclosure describes decoding techniques that reduce crosstalk between the signal lines of a data bus.

BACKGROUND

Modern computing devices continue to incorporate a growing number of components into smaller device chassis. As chassis volumes are decreased, the routing density of the data busses between components increases, which results in corresponding increases in crosstalk noise between the signal lines of the data bus. Crosstalk tends to reduce bus performance, which tends to limit the data rate at which a data bus can successfully transfer data between components. One way of reducing crosstalk in a data bus is to increase the signal line spacing, which limits the degree of miniaturization that can be achieved.

BRIEF DESCRIPTION OF DRAWINGS

FIG. 4 is an encoding matrix, W, used by an N-input encoder, where N corresponds to the number of signal lines controlled by the encoder.

FIG. 6 is decoding matrix, I, used by an N-input encoder, where N corresponds to the number of signal lines coupled to the decoder.

FIG. 9 is a representation of the look-up table to convert the digital value provided from the comparator and recover the digital data.

DETAILED DESCRIPTION

The subject matter disclosed herein relates to signaling techniques for transmitting information between components in a digital system, such as a memory bus on a motherboard, for example. Each of the components can include an Input/Output (I/O) transmitter with an encoding block and an I/O receiver with a decoding block. The data sent between the components is encoded and decoded such that the negative effects of crosstalk are removed or significantly reduced and signal quality is enhanced. The signaling techniques disclosed herein provide significant increases in both routing density and bus speeds on packages, printed circuit boards (PCBs), multi-chip modules (MCMs) and multi-chip packages (MCPs). Increasing the routing density and bus speed enables more functionality to be designed into a smaller volume and helps facilitate the scaling of computer performance in accordance with Moore's Law.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
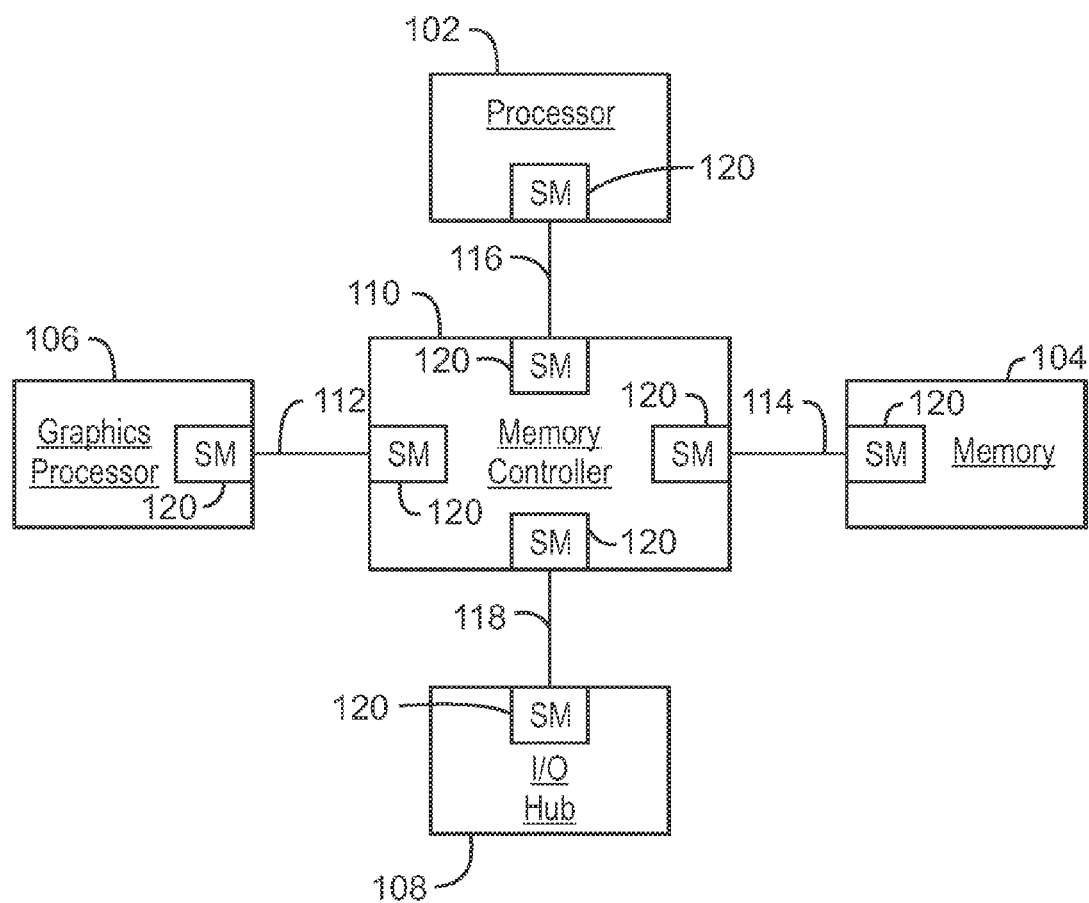
FIG. 1 is a block diagram of an example of a computing system with a signaling module that reduces crosstalk.

FIG. 1 is a block diagram of an example of a computing system 100 with a signaling module that reduces crosstalk. The computing system 100 may be, for example, a mobile phone, laptop computer, ultrabook, desktop computer, server, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein.

The computing system 100 may also include a graphics processor 106 that processes computer generated graphics. The graphics processor 106 is configured to process memory related to the generation of graphics to be sent to a display (not shown). The display may be a built-in component of the computing system 100 externally connected to the computing system 100. The computing system 100 can also include an I/O hub 108 used to connect and control additional I/O devices (not shown), such as network interface controllers, memory storage devices, user input devices, among others. The I/O devices coupled to the I/O hub 108 may be built-in components of the computing system 100, or may be devices that are externally connected to the computing system 100.

The computing system 100 may also include a memory controller hub 110 that handles communications between the processor 102, memory 104, graphics processor 106, and I/O hub 110. Communications between the various components of the computing system 100 can be performed over various data buses. For example, the graphics processor 106 can be coupled to the memory controller 110 through a graphics bus 112. The memory 104 can be coupled to the memory controller 110 through a memory bus 114. The data bus between the processor 102 and the memory controller 110 may be referred to as the front side bus 116. The data bus between the memory controller 110 and the I/O hub may be referred to as the internal bus 118.

In some embodiments, the processor 102, graphics processor 106, memory device 104, memory controller 110, and I/O hub 108 may be separate integrated circuit chips coupled to a mother board. In some embodiments, one or more of the processor 102, the graphics processor 106, the memory device 104, the memory controller 110, and the I/O hub 108 may be included in a multi-chip module (MCM), multi-chip package (MCP), or system-on-a-chip (SOC). Depending on the design considerations of a particular implementation, the signal lines of the one or more of the busses 112, 114, 116, 118 may disposed, at least in part, on one or more circuit boards.

The computing system 100 also includes signaling modules 120 that facilitate digital communications between the components coupled to the respective bus. Each signaling module 120 receives digital data and generates signals that propagate on the signal lines of the various busses. As explained further below, the signals are encoded by a transmitting signaling module and decoded by a receiving signaling module in a way that reduces the effects of crosstalk between the signal lines of the data bus. A respective signaling module 120 may be coupled to, or included in, any component of the computing device 100 that transmits data over a data bus that uses single-ended communications. For example, signaling modules may be included in the processor 102, graphics processor 106, memory device 104, memory controller 110, and I/O hub 108, among others.

It is to be understood that the block diagram of FIG. 1 is not intended to indicate that the computing system 100 is to include all of the components shown in FIG. 1. Rather, the computing system 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate single-ended communications between components. For example, embodiments of the present techniques can also be implemented any suitable electronic device, including ultra-compact form factor devices, such as System-On-a-Chip (SOC) and multi-chip modules. It could also be used on any electrical cable inside or outside of a computer that is used to carry digital information from one point to another. For example, embodiments of the present techniques may be used for connecting disk drives.

Figure 2:
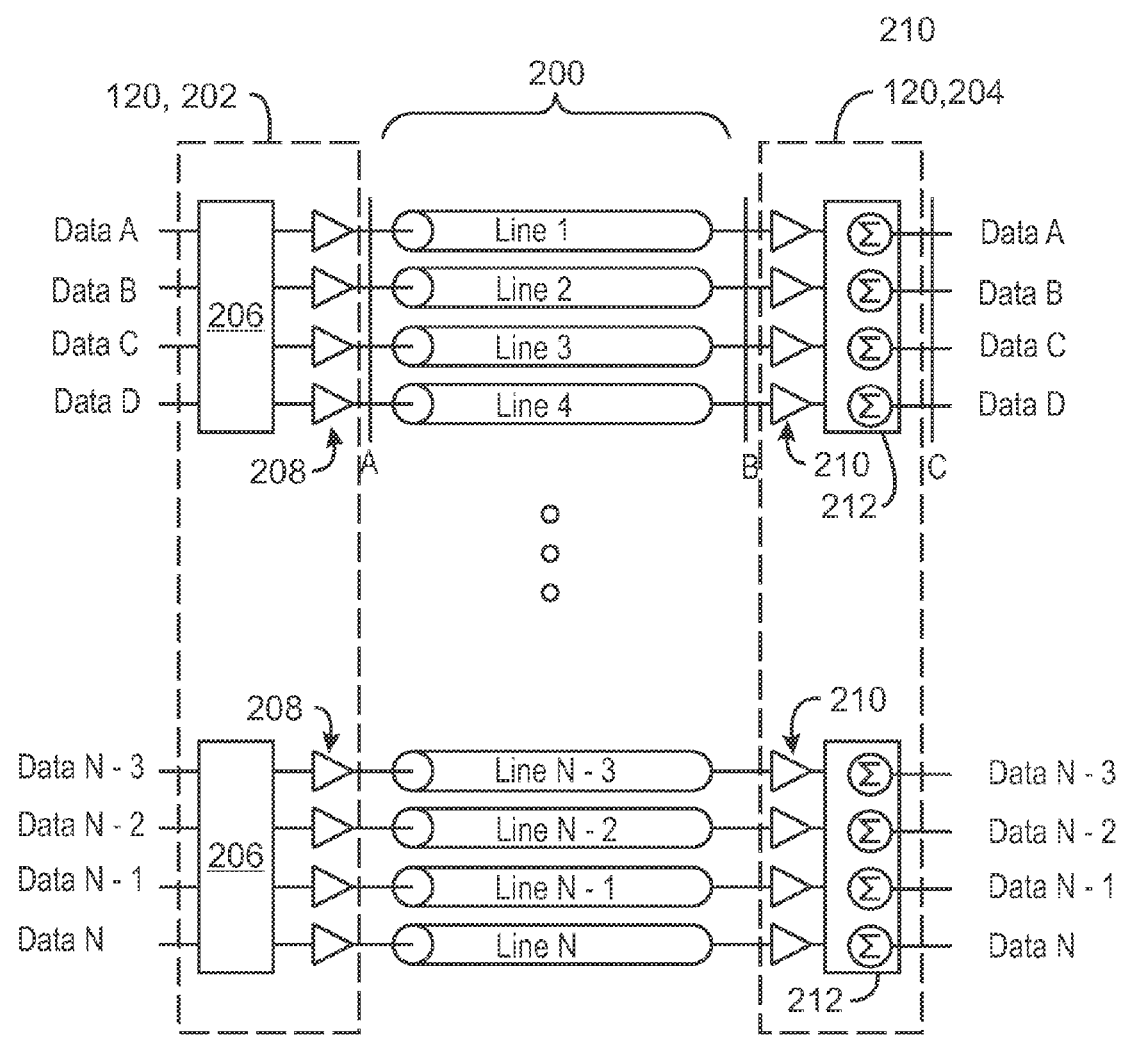
FIG. 2 is a block diagram showing an example of pair of signaling modules at the driving and receiving end of a bus.

FIG. 2 is a block diagram showing an example of a pair of signaling modules at the driving and receiving end of a bus. Specifically, FIG. 2 shows two signaling modules 120 communicatively coupled through a data bus 200 comprising N signal lines, where N can be any suitable number, including but not limited to 2, 4, 16, 32, 64, or 128. In some embodiments, the signal lines are strip lines or micro-strip lines disposed, at least partially, on a circuit board. In some embodiments, the signal lines are disposed, at least partially, in an SOC, multichip-module, or one or more cables. For purposes of the present description, the signaling modules 120 are referred to herein as a transmitting module 202 and a receiving module 204. For the sake of clarity, the transmitting module 202 is shown as including the components used in transmitting, while the receiving module 204 is shown as including the components used in receiving. However, it will be appreciated that in some embodiments, each signaling module 120 will include components for both transmitting and receiving data through the data bus.

The transmitting module 202 includes one or more encoders 206 for encoding the digital bit stream to be transmitted over the bus 200. The encoder 206 includes a number of digital inputs for receiving digitally encoded data from an electronic component (not shown). The digital inputs to the encoder 206 are referred to in FIG. 2 as "Data A" through "Data N". The output of the encoder 206 is coupled to a plurality of transmitters 208, each of which receives a signal from the encoder 206 and transmits a corresponding signal on its respective signal line. The encoder 206 encodes the data transmitted over the bus 200 in such a way that the negative effects of crosstalk are removed and signal quality is enhanced. For example, the bit information corresponding to the single bit of binary data is provided to the encoder 206 and is spread between the four signal lines. This helps to minimize the crosstalk in a number of ways. For example, the magnitude of the crosstalk between the signal lines may be reduced due to the magnitude of the transmitted signal being reduced. Furthermore, as a result of the encoding process, the signals carried on the signal lines may have opposite polarities in some cases, which results in crosstalk cancelation between some of the signal lines.

The receiving module 204 includes receivers 210 coupled to each of the signal lines. Each receiver 210 receives the analog signal transmitted by the respective transmitter 208 of the transmitting module 202 and provides an input signal to a respective decoder 212. The decoder 212 decodes the data transmitted over the data bus 200 and transmits digital data to a receiving electronic component (not shown). Each decoder 212 of the receiving module 204 is paired with a respective encoder 206 of the transmitting module 206.

As shown in FIG. 2, each encoder 206 can control four of the signal lines of the data bus 200. However, in some embodiments, each encoder 206 can control any suitable number of signal lines up to the total number of signal lines of the data bus 200. In some embodiments, such as the one shown in FIG. 2, the data bus 200 is divided between a number of encoder/decoder pairs. In some embodiments, the transmitting module includes a single encoder 206 and the receiving module includes a single decoder 212.

Throughout the present description, reference may be made to nodes which serve as reference points for explaining the present techniques. Specifically, node A refers to the output of the transmitters 208 of the transmitting module 202, node B refers to the input of the receivers 210 of the receiving module 204, and node C refers to the digital output of the decoder 212 at the receiving module 204.

As explained above, the digital inputs for a single encoder 206 (for example, Data A through Data D) are encoded such that the crosstalk from neighboring signal lines becomes a part of the signal transmitted over each signal line. In some embodiments, the encoder 206 uses an encoding matrix to generate the transmitted line signals, so that the line signals driven on a particular signal line is a weighted sum of all of the digital inputs to the encoder 206. In some embodiments, the signal is a voltage signal, and the encoding adjusts the voltage waveform on each signal line such that, upon decode, the crosstalk from the neighboring lines is removed. In some embodiments, the decoder 212 decodes the received line signals using a decoding matrix that is the transpose or inverse of the encoding matrix.

Figure 3:
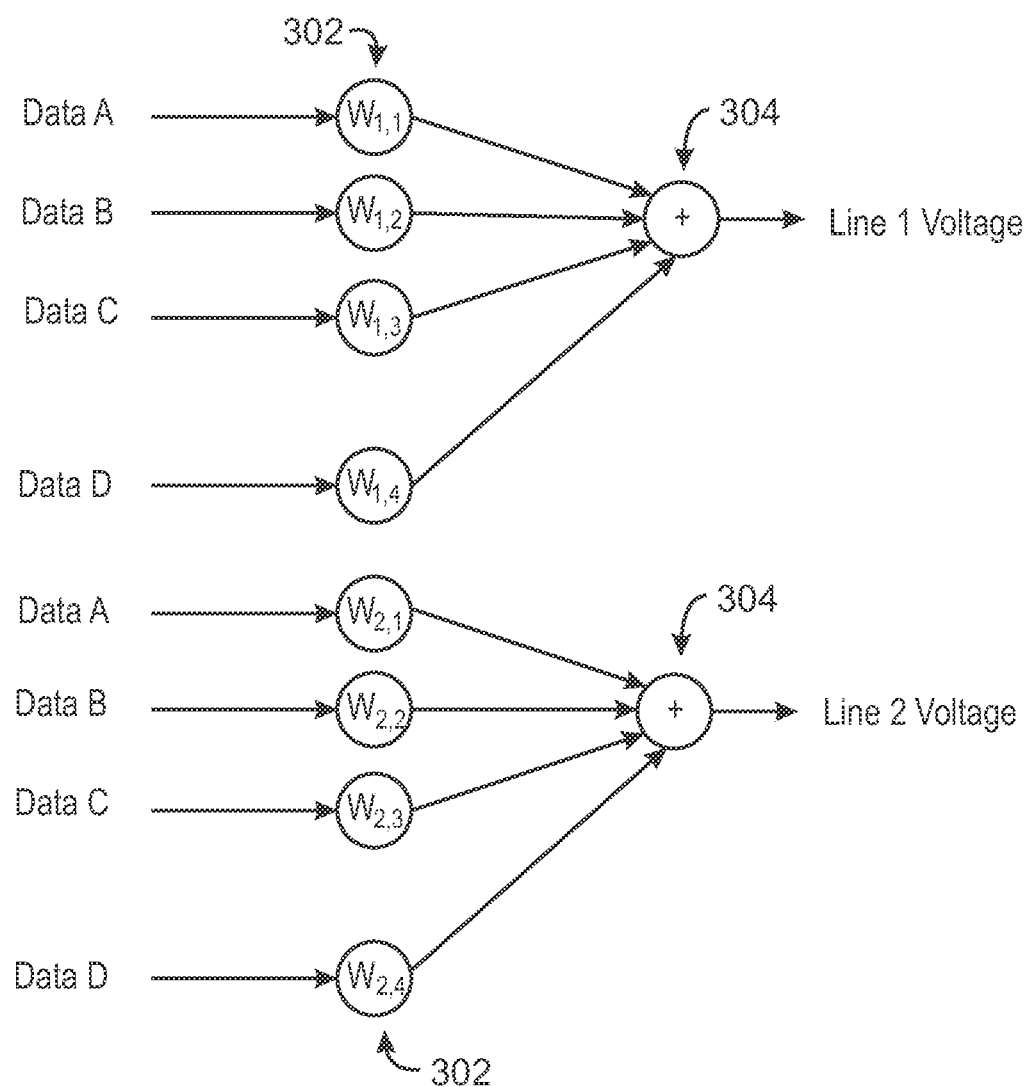
FIG. 3 is a diagram of an encoding process used by the encoder.

FIG. 3 is a diagram of an encoding process used by the encoder. Specifically, FIG. 3 is a mathematical representation of the encoding process used by a four-input encoder, such as one of the encoders 206 of FIG. 2. The diagram 300 of FIG. 3 shows a number of digital inputs, Data A through Data D, which correspond with the four digital inputs of the same name shown in FIG. 2. The diagram 300 of FIG. 3 also shows a number of output line signals, referred to as Line 1 voltage and Line 2 voltage. Line 1 voltage represents the voltage driven on the signal line referred to as "Line 1" in FIG. 2, and Line 2 voltage represents the voltage driven on the signal line referred to as "Line 2" in FIG. 2. It will be appreciated that the four-input encoder will also include a Line 3 voltage and a Line 4 voltage (not shown).

As shown in FIG. 3, the encoder may include weighting logic and summing logic. Data A through Data D are the digital data and include binary voltage levels (for example, 1's and 0's) at the input of the encoder. For each line voltage, the encoder weights each of the four digital inputs, Data A through Data D, according to specified weighting parameters, $W_{ij}$, 302 and the weighted inputs are then added by a summer 304. The output of each summer 304 is used to control the transmitter to drive the corresponding line voltage. After encoding the digital data of the digital inputs, each of the line voltages will be proportional to the weighted sum of each of the digital inputs coupled to the encoder.

As shown in FIG. 3, encoding is based on a weighted sum of input data information from the victim and aggressor lines. In some implementations, the weighted values may be adjusted by a direct current constant to drive signals onto the lines that are compatible with a particular driver circuit design or to eliminate negative line voltages. For purposes of the present description, the term "aggressor line" refers to the source of the crosstalk noise, and the term "victim line" refers to the receiver of the crosstalk noise. The encoding matrix is constructed such that the noise coupled from aggressor to victim lines becomes part of the signal thus removing the negative attributes of crosstalk. The input data information may either consist of the input binary data stream (logical ones and zeros) or their pre-driven voltage values. The weights, $W_{ij}$, may be unique for each input and may be a unique set for each victim line considered. The subscripts i and j indicate victim line number and aggressor line number, respectively.

The process shown in FIG. 3 may be implemented in any suitable hardware, including logic circuits, one or more processors configured to execute computer-readable instructions, and the like. Furthermore, although FIG. 3 shows a diagram of a four-input encoder, the same technique may be used in an encoder with any suitable number digital inputs.

FIG. 4 is an encoding matrix, W, used by an N-input encoder, where N corresponds to the number of signal lines controlled by the encoder. The encoding matrix is a matrix of weighting parameters used to encode the digital data received by the encoder. The size of the encoding matrix will depend on the number of signal lines controlled by the encoder. The weighting parameters, $W_{ij}$, may be specified such the crosstalk between each of the signal lines controlled by the encoder will be reduced, while still ensuring that the digital data that is provided as input to the encoder can be reproduced by the decoder.

Weights may be signed real numbers or integers and are chosen such that crosstalk is minimized and voltage limits of the transmitter and receiver devices are not violated. When combined in matrix form, standard linear algebra can be used to encode the data as shown in equation 1.

$$V_A = (V_{input})^T \times W^T + X_A \quad \text{Eq. 1}$$

In equation 1, $V_A$ is a column vector listing encoded voltages to be transmitted onto the interconnect at node A in FIG. 2, $W_T$ is the transpose of the weighting matrix 400, $X_A$ is a direct current (DC) adjustment factor that may be used to shift the encoded voltage levels so that signal swings are positive, and $V_{input}$ is the input column vector that contains the binary information that is to be transmitted onto the bus (the binary input to the encoder). The voltages, $V_A$, are combined as described by equation 1 and driven out onto the physical signal lines of the bus 200.

The weighting parameters may be assigned real numbers, complex numbers, or integers and are chosen such that crosstalk is minimized and voltage limits of the transmitter and receiver devices are not violated. Once data is transmitted across the channel, crosstalk is effectively removed from the signals and the binary data can be recovered. To minimize crosstalk, the weighting parameters may be specified according to specific rules. For a channel with N signal lines, the weighting parameters represent unique combinations of the data that can be sent on the lines such that the rules expressed in equations 2 and 3 are satisfied.

$$\sum_{i=1}^{N} W_{ij} \cdot W_{ik} = 0 \text{ if } j \neq k; \text{ and} \quad \text{Eq. 2}$$

$$\sum_{i=1}^{N} W_{ij} \cdot W_{ik} = Y \text{ if } j = k, \quad \text{Eq. 3}$$

where Y is a constant

Equation 2 indicates that the dot product between any two columns of the encoding matrix 400 is zero. Equation 3 indicates that the sum of squares for each column of the encoding matrix 500 is non-zero.

Figure 5:
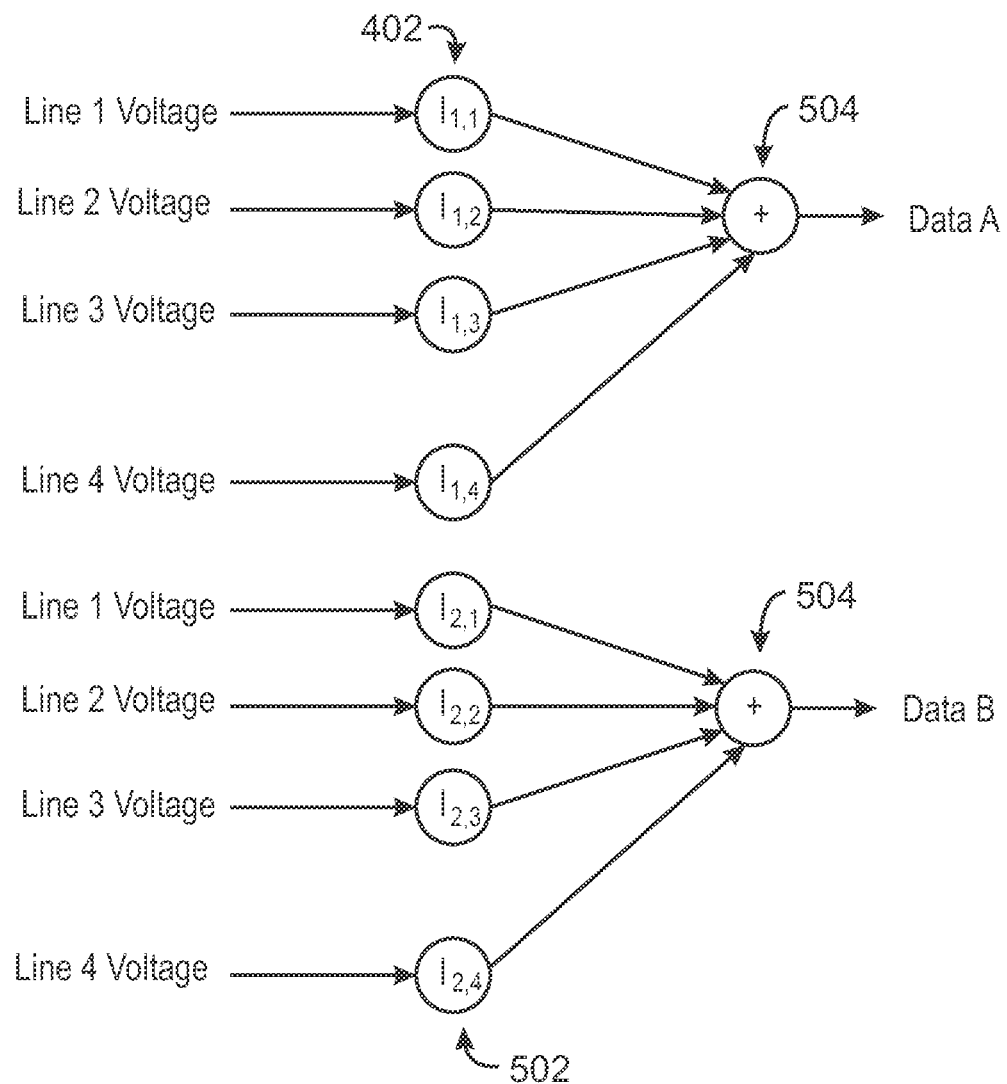
FIG. 5 is a diagram of a decoding process used by a decoder.

FIG. 5 is a diagram of a decoding process used by the decoder. Specifically, FIG. 5 is a mathematical representation of the decoding process used by the decoder 212 that is paired with the encoder 206 of FIGS. 2 and 3. The diagram 500 of FIG. 5 shows a number of line voltage inputs, Line 1 through Line 4, which correspond with the signal lines of the same name shown in FIG. 2. The diagram 500 of FIG. 5 also shows a number of data outputs, referred to as Data A and Data B. The Data A and Data B outputs represent the data outputs of the same name shown in FIG. 2. It will be appreciated that the four-output decoder of FIG. 5 will also include a Data C output and Data D output (not shown).

As shown in FIG. 5, the decoder may include weighting logic and summing logic. For each data output, the decoder weights each of the four line voltages received over the data bus, according to specified weighting parameters, $I_{ij}$, 502 and the weighted line voltages are then added by a summer 504. The line voltages from each signal line are multiplied by corresponding weighting terms, $I_{i,j}$. The subscripts i and j indicate victim line number and aggressor line number, respectively. The output of each summer 504 is used to generate a corresponding digital data output. After decoding the line voltage data, each of the data outputs will be proportional to the weighted sum of each of the line voltages coupled to the decoder. The decoder output referred to as Data A is a digital signal that represents the digital data that was input to the corresponding encoder at the transmitting side of the data bus, which is also referred to as Data A in both FIGS. 2 and 3.

The process shown in FIG. 5 may be implemented in any suitable hardware, including logic circuits, one or more processor configured to execute computer-readable instructions, and the like. Furthermore, although FIG. 5 shows a diagram of a four-output decoder, the same technique may be used in a decoder with any suitable number data outputs.

FIG. 6 is decoding matrix, I, used by an N-input encoder, where N corresponds to the number of signal lines coupled to the decoder. The decoding matrix is a matrix of weighting parameters used to decode the line voltages received by the decoder. The size of the encoding matrix will depend on the number of signal lines coupled to the decoder. To ensure that the digital data can be reproduced by the decoder, the weighting parameters, $I_{ij}$, may be specified such that the decoding matrix, I, is the transpose or inverse of the encoding matrix, W, as represented in Equation 4. Note that the nomenclature for the weighting parameters $I_{ij}$ should not be confused with the identity matrix.

$$W^{-1} = X * W^T, \text{ where } X \text{ is a constant} \qquad \text{Eq. 4}$$

In Equation 4, X is a scaling factor which may be specified to ensure that the voltage or power levels received by the decoder do not exceed the operating limits of the decoder circuitry. The decoding process reverses the operations of the encoding process. An example of a linear algebra equation used for the decoding process is shown below as Equation 5.

$$(V_C)^T = V_B \cdot (W^T)^{-1} \qquad \text{Eq. 5}$$

In Equation 5, $V_C$ is the recovered binary bit stream at node C of FIG. 2, $W^T$ is the transpose of the encoding matrix, and $V_B$ is the sampled encoded data at node B. After the decoding process, the encoded line voltages are converted back to binary voltages and the digital bit stream is recovered.

Figure 7:
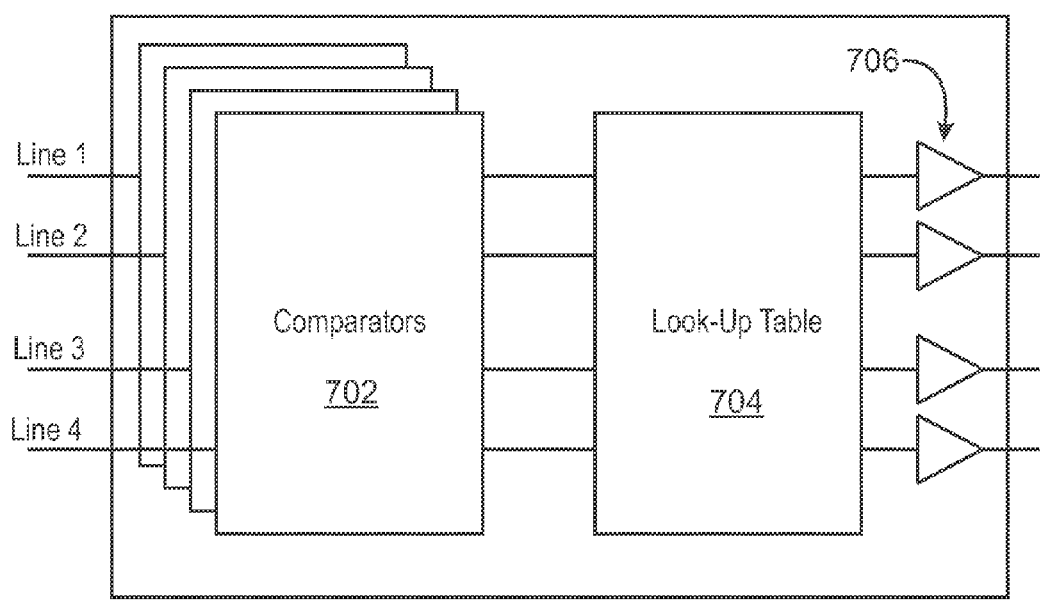
FIG. 7 is a block diagram of a decoder including comparators and a look-up table.

FIG. 7 is a block diagram of a decoder 700 including comparators 702 and a look-up table 704. The decoder 700 may be the decoder 212 discussed above with reference to FIG. 2, that implements the mathematical operations discussed in reference to FIGS. 5 and 6. The decoder 700 is configured to decode signals provided over the signal lines of the bus. The comparators 702 of the decoder 700 are configured to determine the voltage level of each line at a sample time or unit interval. As shown in FIG. 7, each signal line (shown as Line 1, Line, 2, Line 3, Line 4) may be coupled to one of the comparators 702. The comparators 702 may be configured to sample the voltage level of a given signal line for M voltage levels. For example, as shown in FIG. 7 the encoded data can, in some embodiments, be represented as four voltage levels. Once the voltage levels are sampled, the comparators 702 may provide a digital representation of the voltage levels to the look-up table 704. As illustrated in FIG. 7, the decoder 700 may include a number of output latches 706 configured to enable the recovered digital data to be provided to any given component of the computing system 100 of FIG. 1. Although FIG. 7 shows a diagram of a four-output decoder 700, the decoder 700 may be used with any suitable number data outputs.

Figure 8:
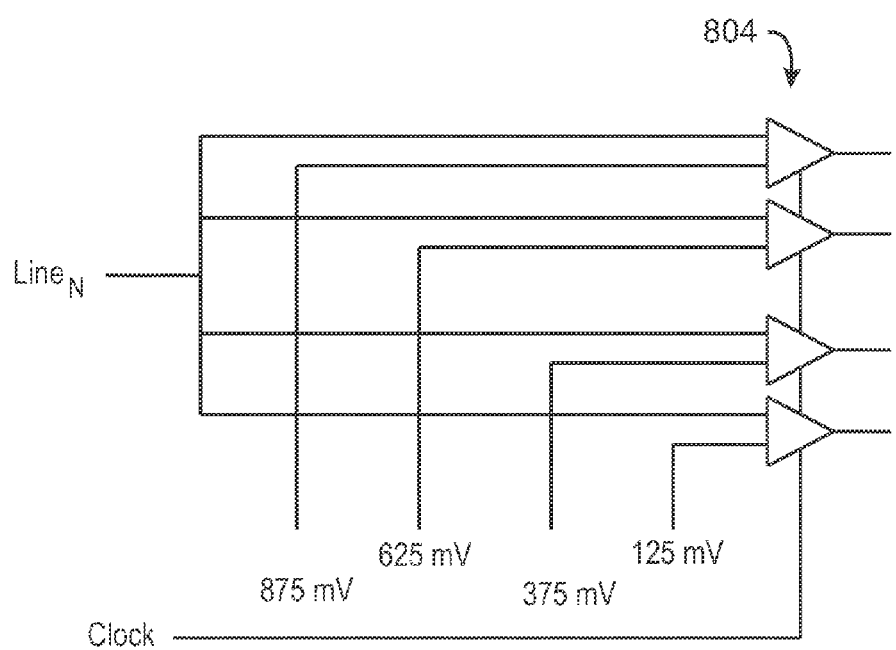
FIG. 8 is a diagram of a comparator for a given signal line.

FIG. 8 is a diagram of a comparator for a given signal line. The comparator 802 may be one of the comparators 702 of FIG. 7. The comparator 802 samples the voltage on the signal line. The comparator 802 may include a number of latches 804 configured to provide an output to the look-up table 704 of the decoder 700 shown in FIG. 7, wherein the output is a digital representation of the voltage of the data line sampled. In the example shown in FIG. 8, the voltage transmitted on the data line at a given unit interval may be approximately 0 volts, 0.25 volts, 0.5 volts, 0.75 volts, or 1 volt. In some embodiments, the voltage may be larger or smaller than these values, the voltage levels may be assymetrically spaced, the number of voltage levels (M) may be any suitable value and the comparator 802 may determine whether the voltage on a given line is within a range of voltage values. For example, the comparator 802 determines whether a given voltage on a given line is greater than or equal to 0 volts, but less than 125 millivolts. A voltage level associated with this range may be determined to be at a 0 voltage level. The comparator 802 may determine additional ranges including whether the voltage level is greater than or equal to 125 millivolts and less than 375 millivolts, greater than or equal to 375 millivolts and less than 625 millivolts, greater than or equal to 625 millivolts and less than 875 millivolts, and greater than or equal to 875 millivolts, and the like. Each of the determined voltages, or determined range of voltage, may be associated with a digital value.

As illustrated in the table 1 below, the voltage levels may be associated with a digital value that is digital representation of the voltage levels on the sampled line. The digital value may be provided to the look-up table 704 to determine the digital data originally encoded by the encoder as discussed above in reference to FIGS. 2-4.

TABLE 1

| Voltage Range | Voltage Level | Digital Value |
| --- | --- | --- |
| 0 mV to >125 mV | 0 V | 0000 |
| 125 mV to >375 mV | .25 V | 0001 |
| 375 mV to >625 mV | .5 V | 0011 |
| 625 mV to >875 mV | .75 V | 0111 |
| 875 mV to >1 V | 1 V | 1111 |

As illustrated in Table 1, each of the digital outputs in the right-most column may be associated with respective voltage levels in the middle column. In other words, the comparator may translate each voltage level transmitted on each of the data lines with a digital value as a representation of the voltage level.

FIG. 9 is a representation of the look-up table 704 to convert the digital value provided from the comparator and recover the digital data. A "look-up table", as referred to herein, is a mechanism configured to correlate digital values provided by the comparators, such as the comparators 702 of FIG. 7 and the comparator 802 of FIG. 8. The look-up table 704 may be implemented using any suitable hardware or software, including logic circuits, one or more processor configured to execute computer-readable instructions, and the like. As discussed in reference to FIG. 8 and Table 1 above, the output of the comparator 802 is a digital representation of the voltages at each of the signal lines. The digital representation of each voltage may be used in the look-up table 704 to determine the digital data provided to the transmitting module 202 of FIG. 2. The output of the lookup table 704 represents the output at node C as shown in FIG. 2, wherein the digital data input to the encoder 206 is reproduced and output by the decoder 212. The digital data is a digital signal that represents the digital data that was input to the corresponding encoder at the transmitting side of the data bus, which is also referred to as Data A in both FIGS. 2 and 3. The look-up table 704 may be derived based on the encoding matrix, or the inverse of the encoding matrix discussed above in reference to FIGS. 4 and 6 and equation 1 and 5. Thus, the output of the comparators 702 can be correlated directly to the original binary data at the input to the bus (Data A, Data B . . . etc) so the data can be recovered at node C in binary form.

Figure 10:
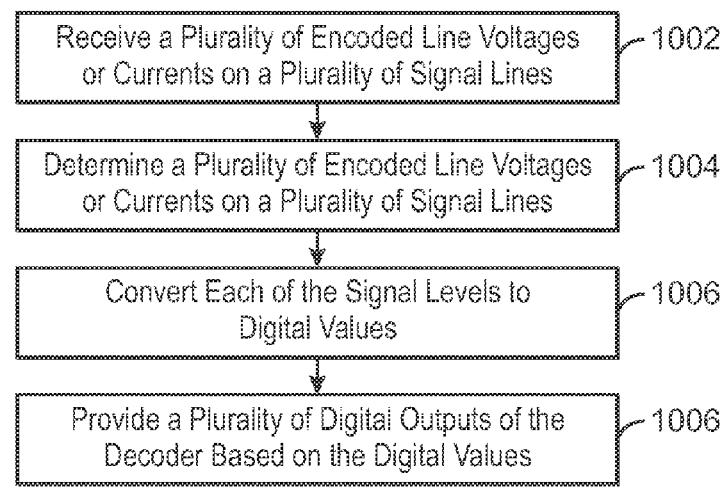
FIG. 10 is a process flow diagram summarizing a method for decoding encoded signals.

FIG. 10 is a process flow diagram summarizing a method for decoding encoded signals. The method 1000 may include, at block 1002 receiving a plurality of encoded line voltages or currents on a plurality of signal lines. The method 1000 may include, at block 1004, determining a plurality of encoded line voltages or currents on a plurality of signal lines. The method 1000 may include, at block 1006, converting each of the signal levels to digital values. The method 1000 may include, at block 1008, providing a plurality of digital outputs of the decoder based on the digital values, wherein an individual output of the plurality of digital outputs depends on a combination of the digital values received during the same unit interval.

The encoded line signal is received, at block 1002, from logic to weight data received on each of a plurality of digital inputs based, at least in part, on an encoding matrix. The method 1000 may include multiplying the data received by a weighting parameter received from an encoding matrix. A dot product between any two columns of the encoding matrix is approximately zero and the sum of squares for each column of the encoding matrix is non-zero. The decoding, at block 1006, of the digital output of the plurality of line voltages to digital data is based on the inverse of the encoding matrix.

Example 1

A signaling module is described. The signaling module includes a receiver to receive a plurality of encoded line voltages or currents on a plurality of signal lines. The signaling module includes a comparator to determine a signal level of each of the plurality of signal lines at a unit interval and convert each of the signal levels to digital values. The signaling module includes a lookup table to provide a plurality of digital outputs of the decoder based on the digital values, wherein an individual output of the plurality of digital outputs depends on a combination of the digital values received during the same unit interval.

Example 2

An electronic device is described. The electronic device includes a bus comprising a plurality of signal lines. The electronic device includes a first signaling module coupled to a plurality of digital inputs, the first signaling module to encode data received at the plurality of digital inputs and drive signals on the plurality of signal lines of the bus, wherein each one of the plurality of signals corresponds to a weighted sum of the data received at the plurality of digital inputs. The electronic device includes a second signaling module coupled to the plurality of signal lines of the bus, the second signaling module to decode the plurality of signals received over the bus and generate a corresponding plurality of digital outputs, wherein the values of the plurality of digital outputs are equal to the values of the plurality of digital inputs. The second signaling module includes a comparator to determine a signal level of each of the plurality of signal lines at a unit interval and convert each of the signal levels to digital values. The second signaling module includes a lookup table to provide a plurality of digital outputs of the decoder based on the digital values, wherein an individual output of the plurality of digital outputs depends on a combination of the digital values received during the same unit interval.

Example 3

An electronic device is described herein. The electronic device includes logic to receive a plurality of encoded line voltages or currents on a plurality of signal lines The electronic device includes logic to determine a signal level of each of the plurality of signal lines at a sample time and convert each of the signal levels to digital values. The electronic device includes logic to provide a plurality of digital outputs of the decoder based on the digital values, wherein an individual output of the plurality of digital outputs depends on a combination of the digital values received during the same sample time.

Example 4

A method is described herein. The method includes receiving a plurality of encoded line voltages or currents on a plurality of signal lines. The method includes determining a signal level of each of the plurality of signal lines at a unit interval. The method includes converting each of the signal levels to digital values. The method includes providing a plurality of digital outputs of the decoder based on the digital values, wherein an individual output of the plurality of digital outputs depends on a combination of the digital values received during the same unit interval.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A signaling module, comprising:
   a receiver to receive a plurality of encoded line voltages or currents on a plurality of signal lines, wherein the encoded line voltages or currents are encoded by an encoder by weighting data received on each of a plurality of digital inputs based, at least in part, on an encoding matrix and wherein a dot product between any two columns of the encoding matrix is approximately zero and the sum of squares for each column of the encoding matrix is non-zero;
   a comparator to determine a signal level of each of the plurality of signal lines at a unit interval and convert each of the signal levels to digital values; and
   a lookup table to provide a plurality of digital outputs of a decoder comprising the lookup table based on the digital values, wherein an individual output of the plurality of digital outputs depends on a combination of the digital values received during the same unit interval.

2. The signaling module of claim 1, wherein the lookup table is based on the encoding matrix or an inverse of the encoding matrix and a suitable direct current (DC) offset.

3. The signaling module of claim 1, wherein the lookup table is implemented as a plurality of digital logic circuits.

4. The signaling module of claim 1, wherein the signaling module is implemented on an integrated circuit chip of a central processing unit, micro controller, IO hub, chipset, memory controller hub (MCH) of a digital system using software.

5. The signaling module of claim 4, wherein the integrated circuit chip is a graphics processor.

6. An electronic device, comprising:
   a bus comprising a plurality of signal lines;
   a first signaling module coupled to a plurality of digital inputs, the first signaling module to encode data received at the plurality of digital inputs and drive signals on the plurality of signal lines of the bus, wherein each one of the plurality of signals corresponds to a weighted sum of the data received at the plurality of digital inputs, wherein the first signaling module comprises an encoder to encode the data, the encoder to weight the data received on each of the plurality of digital inputs based, at least in part, on an encoding matrix and wherein a dot product between any two columns of the encoding matrix is zero and the sum of squares for each column of the encoding matrix is non-zero; and
   a second signaling module coupled to the plurality of signal lines of the bus, the second signaling module to decode the plurality of signals received over the bus and generate a corresponding plurality of digital outputs, wherein the values of the plurality of digital outputs are equal to the values of the plurality of digital inputs, the second signaling module comprising:
   a comparator to determine a signal level of each of the plurality of signal lines at a unit interval and convert each of the signal levels to digital values; and
   a lookup table to provide a plurality of digital outputs of a decoder comprising the lookup table based on the digital values, wherein an individual output of the plurality of digital outputs depends on a combination of the digital values received during the same unit interval.

7. The electronic device of claim 6, wherein the lookup table is based on an encoding matrix or the inverse of the encoding matrix and a direct current (DC) offset.

8. The electronic device of claim 6, wherein the lookup table is implemented as a plurality of digital logic circuits.

9. The electronic device of claim 6, wherein the electronic device is a tablet PC, Ultrabook, desktop, or server.

10. The electronic device of claim 6, wherein the electronic device is a mobile phone.

11. The electronic device of claim 6, wherein a trace-to-trace spacing between the plurality of signal lines of the bus is significantly small to introduce significant crosstalk noise.

12. The electronic device of claim 6, wherein a bandwidth density of the bus is greater than approximately 16 Giga-transfers per second per meter squared.

13. An electronic device, comprising:
    logic to receive a plurality of encoded line voltages or currents on a plurality of signal lines, wherein the encoded line voltages or currents are received from logic to weight data received on each of a plurality of digital inputs based, at least in part, on an encoding matrix, and wherein a dot product between any two columns of the encoding matrix is approximately zero and the sum of squares for each column of the encoding matrix is non-zero;
    logic to determine a signal level of each of the plurality of signal lines at a sample time and convert each of the signal levels to digital values; and
    logic to provide a plurality of digital outputs of a decoder comprising the lookup table based on the digital values, wherein an individual output of the plurality of digital outputs depends on a combination of the digital values received during the same sample time.

14. The electronic device of claim 13, wherein the logic to provide a plurality of digital outputs of the encoder is based on an inverse of the encoding matrix.

15. The electronic device of claim 13, wherein the logic to provide a plurality of digital outputs of the encoder is implemented as a plurality of digital logic circuits.

16. A method, comprising:
    receiving a plurality of encoded line voltages or currents on a plurality of signal lines, wherein the encoded line voltages or currents are decoded by a decoder by weighting data received on each of a plurality of digital inputs based, at least in part, on an encoding matrix and wherein a dot product between any two columns of the encoding matrix is approximately zero and the sum of squares for each column of the encoding matrix is non-zero;
determining a signal level of each of the plurality of signal lines at a unit interval;
converting each of the signal levels to digital values; and
providing a plurality of digital outputs based on the digital values, wherein an individual output of the plurality of digital outputs depends on a combination of the digital values received during the same unit interval.

17. The method of claim 16, wherein providing a plurality of digital outputs of the decoder is based on the encoding matrix or an inverse of the encoding matrix.

* * * * *